United States Patent [19]

Mischenko et al.

[11] Patent Number: 4,963,812
[45] Date of Patent: Oct. 16, 1990

[54] BATTERY CHARGER HOUSING FOR BATTERIES OF DIFFERING DIMENSIONS

[75] Inventors: Nicholas Mischenko, Mt. Prospect; Albert L. Nagele, Wilmette, both of Ill.

[73] Assignee: Motorola, Inc., Schaumburg, Ill.

[21] Appl. No.: 415,517

[22] Filed: Oct. 2, 1989

[51] Int. Cl.[5] .................... H02J 7/00; H01M 10/46
[52] U.S. Cl. ........................................ 320/2; 320/15
[58] Field of Search ............................... 320/2, 15

[56] References Cited

U.S. PATENT DOCUMENTS

| | | | |
|---|---|---|---|
| D. 229,499 | 12/1973 | Krumin et al. | D13/5 |
| D. 229,500 | 12/1973 | Krumin et al. | D13/5 |
| D. 241,555 | 9/1976 | Goldman et al. | D13/5 |
| D. 244,618 | 6/1977 | Goldman et al. | D13/5 |
| D. 271,391 | 11/1983 | Scheid | D13/5 |
| D. 274,903 | 7/1984 | Eckman et al. | D13/5 |
| D. 276,149 | 10/1984 | Eckman et al. | D13/5 |
| D. 281,064 | 10/1985 | Scheid | D13/5 |
| D. 297,827 | 9/1988 | Lay | D13/6 |
| D. 298,119 | 10/1988 | Richards | D13/6 |
| D. 298,230 | 10/1988 | Lay | D13/6 |
| 3,370,987 | 4/1966 | Rush | 429/98 |
| 3,390,319 | 6/1968 | Robison | 320/2 |
| 3,881,961 | 5/1975 | Nation | 429/97 |
| 4,214,197 | 7/1980 | Mann et al. | 320/2 |
| 4,391,883 | 7/1983 | Williamson et al. | 429/97 |
| 4,403,183 | 9/1983 | Yeh | 320/2 |
| 4,419,616 | 12/1983 | Baskins et al. | 320/2 |
| 4,578,628 | 3/1986 | Siwiak | 320/2 |
| 4,641,370 | 2/1987 | Oyamada | 455/348 |
| 4,766,361 | 8/1988 | Pusateri | 320/2 |
| 4,816,735 | 3/1989 | Cook et al. | 320/2 |

OTHER PUBLICATIONS

Motorola, Inc., Model TPN6157A: AC Trickle Charger, Manual No. 68P81069E76-A, Oct. 15, 1985.
Motorola, Inc. Model SLN691A: One-Hour Charger, Manual No. 68P81114E41-B, Mar. 7, 1986, pp. 1-4, 12.

*Primary Examiner*—R. J. Hickey
*Attorney, Agent, or Firm*—Raymond A. Jenski; Rolland R. Hackbart

[57] ABSTRACT

A battery charger for charging batteries of varying sizes is disclosed. Batteries to be charged are inserted into a recess in the battery charger housing and are captivated by a lip portion which extends into the recess. The lip portion has a plurality of surfaces, one of which surfaces contacts a surface of a battery of one size and maintains the position of the battery against the charging contacts of the battery charger. Different size batteries contact different lip surfaces.

3 Claims, 2 Drawing Sheets

BATTERY CHARGER HOUSING FOR BATTERIES OF DIFFERING DIMENSIONS

BACKGROUND OF THE INVENTION

This invention relates generally to a housing for a battery charger and more particularly to a battery charger housing having a lip in the front wall of the housing which enables the battery charger to accommodate batteries of different sizes and direct the different size batteries against the electrical charging contacts of the battery charger.

This invention is related in appearence to the design disclosed in U.S. patent application Ser. No. 390,999 filed on Aug. 9, 1989 in behalf of Albert L. Nagele, et al. and assigned to the assignee of the present invention.

Portable electronic equipment traditionally employs rechargeable batteries and many varied designs of battery chargers have been developed to recharge the batteries. In many instances, the electrochemical cells which comprise the battery are housed or contained in an enclosure which provides protection and support for the electrochemical cells. For example, a detachable battery housing containing several electrochemical cells is employed in a portable cellular radiotelephone manufactured by Motorola, Inc. and having an appearance similar to that shown in U.S. Pat. No. D269,873 and assigned to the assignee of the present invention. The general appearance of the battery housing may be ascertained from the aforementioned design patent as that portion extending from the top to the bottom at the rear of the portable radiotelephone and visible in FIGS. 2, 3, and 4.

Conventionally, battery chargers utilize one or more charging pockets or recesses to hold batteries. Typically, these chargers utilize vertical insertion of the battery to be charged in order that the battery be pressed against the electrical contacts within the charging pocket of the charger by the force of gravity. In those instances where the battery inserted at an angle from vertical or is horizontally inserted, only a single size battery may be accommodated or a more complex apparatus is used.

SUMMARY OF THE INVENTION

Accordingly, the present invention solves the problem of accommodating different battery sizes without undue complexity.

It is one object of the present invention to position a battery housing within a battery charger.

It is a further object of the present invention to employ a sloped charging recess and a stepped lip in the recess wall to correctly position batteries of varying sizes within the battery charger.

DETAILED DESCRIPTION OF THE PREFERRED EMBODIMENT

The preferred embodiment of the present invention is a battery charger with a housing having the capability of easily guiding and supporting several sizes of rechargeable batteries such that each size battery may be properly positioned against the charging contacts of the battery charger. Such a battery charger and housing is shown in the isometric view of FIG. 1. Here, a battery charger (101) has a recess (103) into which a rechargeable battery may be placed. Although a single recess for one battery is shown, the present invention may be employed in battery housing having two or more such recesses. Furthermore, a battery charger such as that of the preferred embodiment may also be used to charge batteries which are attached to the electronic equipment to which they supply power. A battery charger having a similar appearance has been disclosed in U.S. patent application Ser. No. 390,999 "Housing for a Battery Charger or Similar Article", filed on Aug. 9, 1989 on behalf of Nagele, et al. and assigned to the assignee of the present invention.

Figure 1:
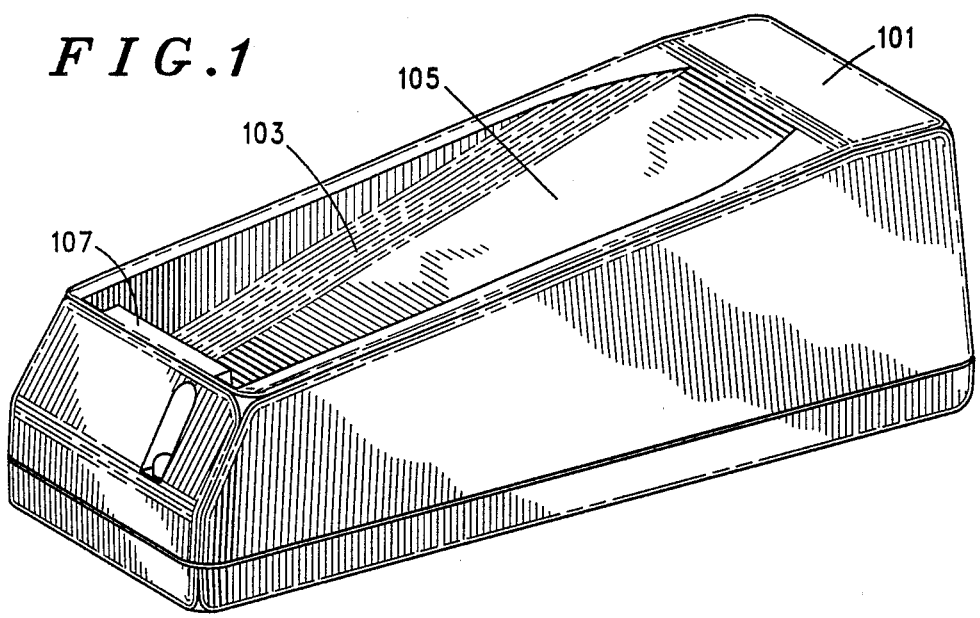
FIG. 1 is an isometric view of the battery charger of the present invention.

User operation of the battery charger of FIG. 1 is accomplished by placing a battery in the recess (103) by elevating the battery over the top surface and somewhat to the rear of the battery charger housing (101) and moving the battery down into the reces (103) and toward the front of the battery charger housing (101) so that the battery rests on the bottom surface (105) of the recess (103) and has one end of the battery captivated by the lip (107) of the front edge of the recess (103).

Figure 2A:
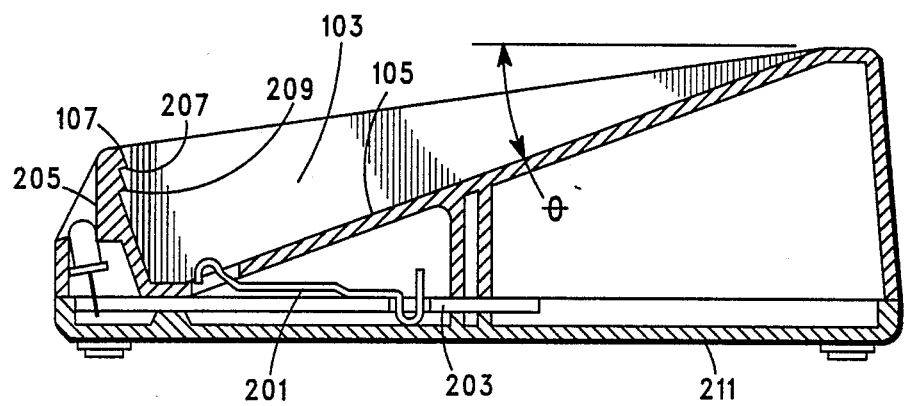
FIG. 2A is a cross section of the housing of the present invention from the front to the back of the housing.

A cross-section of the housing of the battery charger of the present invention is shown in FIG. 2A. This cross-section is from the front of the battery charger shown at the left, to the rear of the battery charger housing shown at the right. An electrical contact (201) protrudes from the bottom surface (105) of the recess (103) and provides electrical connection from the charging circuitry on circuit board (203) to a rechargeable battery (not shown) which would be inserted in the recess (103). The end of recess (103) is determined by a wall (205), which in the preferred embodiment is oriented perpendicularly to the recess bottom surface (105) and serves to provide a stop for a battery which has been inserted in the recess.

Figure 2B:
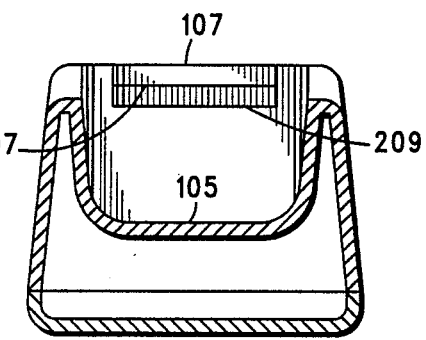
FIG. 2B is a side-to-side cross section of the housing of the present invention taken in a plane perpendicular to the plane of the sloping inside surface of the charger recess.

It is an important feature of the present invention that the wall (205) further has a lip (107) protruding into the space of the recess (103). In the preferred embodiment, the lip has a stair step form in cross-section which provides an upper surface (207) and a lower surface (209) which are essentially planar and parallel to the recess bottom surface (105). Upper surface (207) and lower surface (209) can further be seen in FIG. 2B and, in the preferred embodiment, extend part way across the recess (103).

Figure 3A:
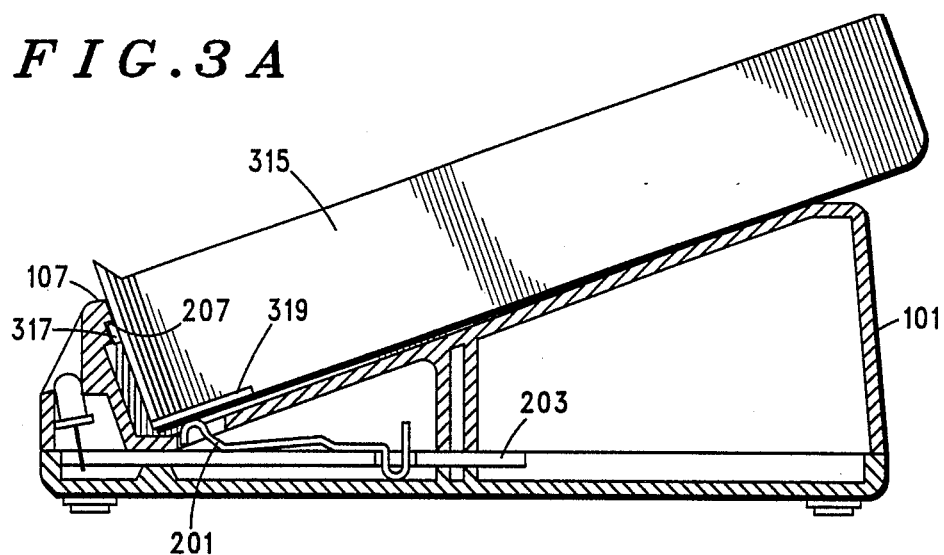
FIG. 3A is a cross-section of the battery charger housing of the present invention illustrating the position of a large size battery in the charging position.
Figure 3B:
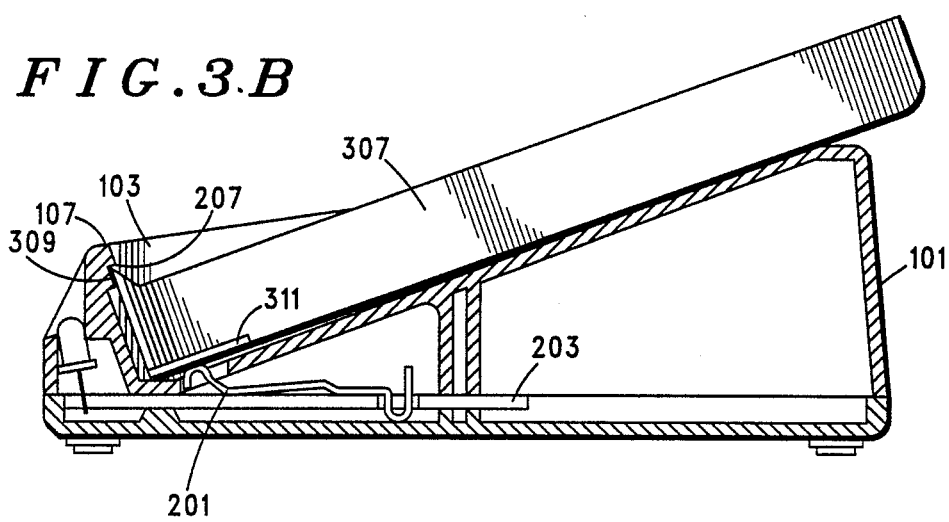
FIG. 3B is a cross-section of the battery charger housing of the present invention illustrating the position of a medium size battery in the charging position.
Figure 3C:
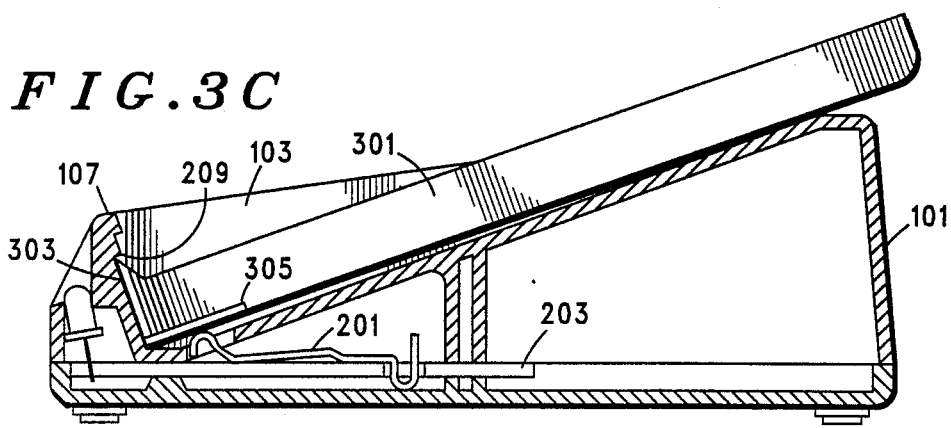
FIG. 3C is a cross-section of the battery charger housing of the present invention illustrating the position of a small size battery in the charging position.

Batteries of different sizes may be captivated beneath the upper surface (207) or the lower surface (209) as shown in FIGS. 3A, 3B, and 3C. In FIG. 3C, a battery (301), having a relatively narrow configuration, has been placed in recess 103 and is captivated by the lower surface (209). The battery (301) has a protrusion (303)

located at the end at which charging contacts (305) are located. The protrusion (303) is captured between lower surface (209) such that the electrical contacts (305) are maintained in contact with electrical contract (201). A larger battery (305), having a relatively greater thickness, employs a protrusion (309) which is captivated by upper surface (207). This captivation of the battery (307) enables charging contacts (311) to be maintained in contact with contact (201). A third, larger, battery (315) may also be captivated under surface (207) by means of a protrusion (317) on the lower surface of the battery (315). This captivation also enables charging contact (319) to be maintained in electrical connection with contact (201).

In the preferred embodiment, the recess bottom surface (105) is sloped at an angle, $\theta$, relative to a plane parallel to the plane of the base (211) of the battery charger. This slope enables the battery to be held in position by gravity and, in the preferred embodiment, the angle $\theta$ equals 20°.

Thus, a battery charger which can accommodate batteries of different sizes and direct the electrical contacts of any of the different size batteries against the charging contacts of the battery charger has been shown and described.

We claim:

1. A housing for a battery charging apparatus which charges batteries of differing dimensions, the housing having top, bottom, front, and back external surfaces and comprising:
   a recess disposed in the top external surface and having at least one wall and a bottom surface, said bottom surface sloping from the top external surface toward the bottom external surface and the front external surface;
   a wall of said recess, extending from said bottom surface of said recess to the top external surface, one side of said wall forming at least a portion of the front external surface; and
   a lip portion, disposed on a second side of said wall and near the top external surface, having a first surface on one side of said lip portion disposed between the top external surface and said bottom surface of said recess, a second surface disposed on a second side of said lip portion and between said first surface and said bottom surface of said recess, and a third surface disposed on said second side of said lip portion and between said second surface and said bottom surface of said recess,
   whereby a battery of a first dimension may be captivated between said second surface of said lip portion and said bottom surface of said recess and a battery of a second dimension may be captivated between said third surface of said lip portion and said bottom surface of said recess 2. A housing in accordance with claim 1 wherein said second and third surfaces of said lip portion further comprise parallel planes.

3. A housing in accordance with claim 2 wherein said bottom surface of said recess further comprises a planar surface parallel to said planes of said second and third surfaces.

* * * * *